United States Patent [19]
Parsons

[11] Patent Number: 4,732,137
[45] Date of Patent: Mar. 22, 1988

[54] BASTING APPARATUS FOR BARBECUE GRILLS

[76] Inventor: Lee R. Parsons, 74 582 Candlewood, Palm Desert, Calif. 92260

[21] Appl. No.: 937,837

[22] Filed: Dec. 4, 1986

[51] Int. Cl.⁴ .............................................. A47J 37/04
[52] U.S. Cl. .................... 126/25 R; 99/345; 99/347
[58] Field of Search ............ 126/25 R, 25 A; 99/443 R, 345, 347, 348, 335, 407, 492

[56] References Cited

U.S. PATENT DOCUMENTS

| 1,789,349 | 1/1931 | Ballmam | 99/347 |
| 2,083,147 | 6/1937 | Clarkson | 99/345 |
| 3,022,721 | 2/1962 | Vath | 99/345 |
| 3,339,480 | 9/1967 | Raman et al. | 99/345 |
| 3,839,050 | 10/1974 | Gordon | 99/345 |
| 4,061,083 | 12/1977 | Caliva | 99/345 |

FOREIGN PATENT DOCUMENTS 2234107  7/1972  Fed. Rep. of Germany ........ 99/345
263745   7/1927  United Kingdom ................. 99/345

Primary Examiner—Randall L. Green
Assistant Examiner—H. A. Odar
Attorney, Agent, or Firm—Charles R. Rhodes; Judith E. Garmon

[57] ABSTRACT

An apparatus for dispensing a liquid basting sauce includes an elongated sauce delivery tube having multiple spray nozzles suspended in spaced relationship along the length of the tube. The sauce delivery tube is mounted on the barbecue grill in a position above the food being cooked or, alternatively, intermediately between the food and the firebox. Connected to one end of the delivery tube is a pressurized sauce supply bottle which contains the selected basting sauce. A timer-controlled injection valve connects the sauce supply bottle to the delivery tube, and upon activation of the valve by the selected timer device, sauce is injected under pressure into the tube and dispensed through the spray nozzles.

8 Claims, 4 Drawing Figures

BASTING APPARATUS FOR BARBECUE GRILLS

BACKGROUND AND SUMMARY OF THE PRESENT INVENTION

In the environment of outdoor cookery on barbecue grills, or in larger commercial cookers, various apparatus have been developed for applying a basting sauce to the meat or food being cooked. The primary objects of the basting sauce are to flavor and moisten the foods being cooked, and/or to increase the smoke from the smoldering coals which are used to cook the food.

Although the present application is not to be construed as excluding commercially-sized grills or roasting ovens, or conventional residential stoves and ovens, more generally the invention described herein is used on smaller, residential or "backyard" barbecue grills. Such grills usually include a fuel pan, a meat-supporting rack above the fuel pan, and a hood which partially or fully encloses the pan. Previous devices used for applying a basting sauce to the cooking food are described in U.S. Pat. Nos. 2,109,796; 3,022,721; 3,563,160; and 3,972,276. Two of these patents, U.S. Pat. Nos. 2,109,796 and 3,563,160, are generally directed to commercially-sized cookers and disclose complex basting systems which could not be utilized on home barbecues because large commercial ovens are not structured as, and do not function in the same manner as a barbecue grill. The other U.S. Pat. Nos. 3,022,721 and 3,972,276, devices for home barbecues, but the devices are manually operated and require constant attention if basting sauce is to be applied consistently. None of the prior art known to exist at the time of filing includes a basting apparatus that may be automatically or manually controlled to apply basting sauce, and which may be attached to the barbecue grill by the original manufacturer or may be retrofitted on existing grills.

The present invention, in a preferred embodiment, is a basting apparatus that dispenses sauce over the food being cooked or, alternatively dispenses a flavoring liquid directly on the burning coals to increase smoke and thereby improve the charcoal flavor of the meat or other food.

A preferred embodiment of the apparatus generally includes a sauce delivery tube with attached multiple spray heads suspended over the food or the coals, or both; which tube receives the basting liquid from a pressurized sauce supply bottle attached to one end thereof. A timer-controlled injection valve operatively connects the pressurized sauce bottle to the delivery tube and controls the injection of sauce into the tube and attached spray heads at predetermined time intervals.

As previously described, the sauce delivery tube and attached spray heads can be mounted in the hood portion of the grill, over the cooking food; or may be mounted between the inside surfaces of the walls of the fuel pan, between the food and the burning coals. If mounted in the hood portion, the preferred embodiment provides for adjusting the distance between the sauce delivery tube and the cooking rack, as will be described in detail below.

It is therefore a primary objective of the present invention to provide a basting apparatus for use on home or commercial barbecues; which apparatus automatically controls the application of basting sauce according to predetermined time intervals. Another objective is the provision of a basting apparatus which can be installed as a part of the original equipment or retrofitted on existing barbecue grills. Other and further modifications will become apparent to those skilled in the art as the following detailed description is studied in conjunction with the following drawings.

IN THE DRAWINGS

DETAILED DESCRIPTION OF A PREFERRED EMBODIMENT

Figure 1:
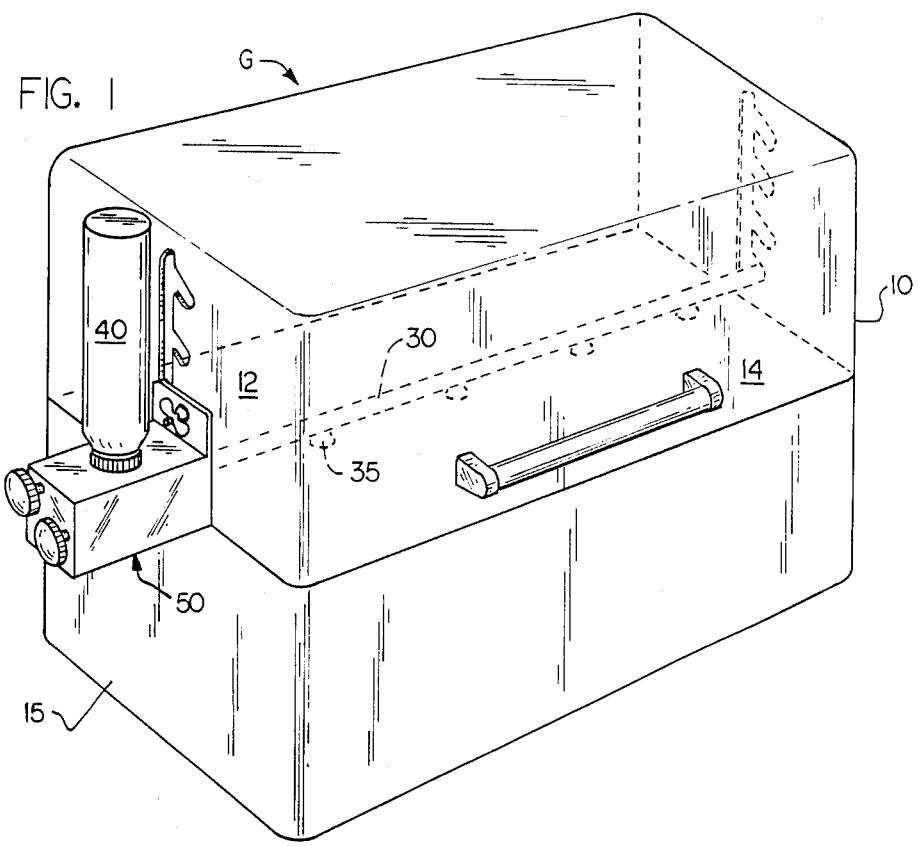
FIG. 1 is a perspective view of a barbecue grill including the preferred embodiment of the present invention mounted in the hood.
Figure 2:
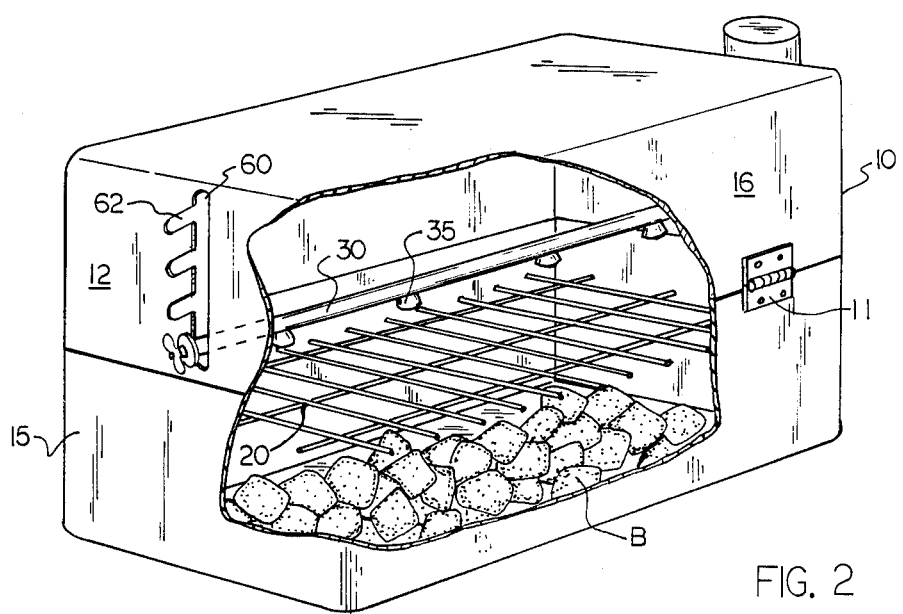
FIG. 2 is a perspective view, with parts broken away, taken from the opposite side of the grill shown in FIG. 1.
Figure 3:
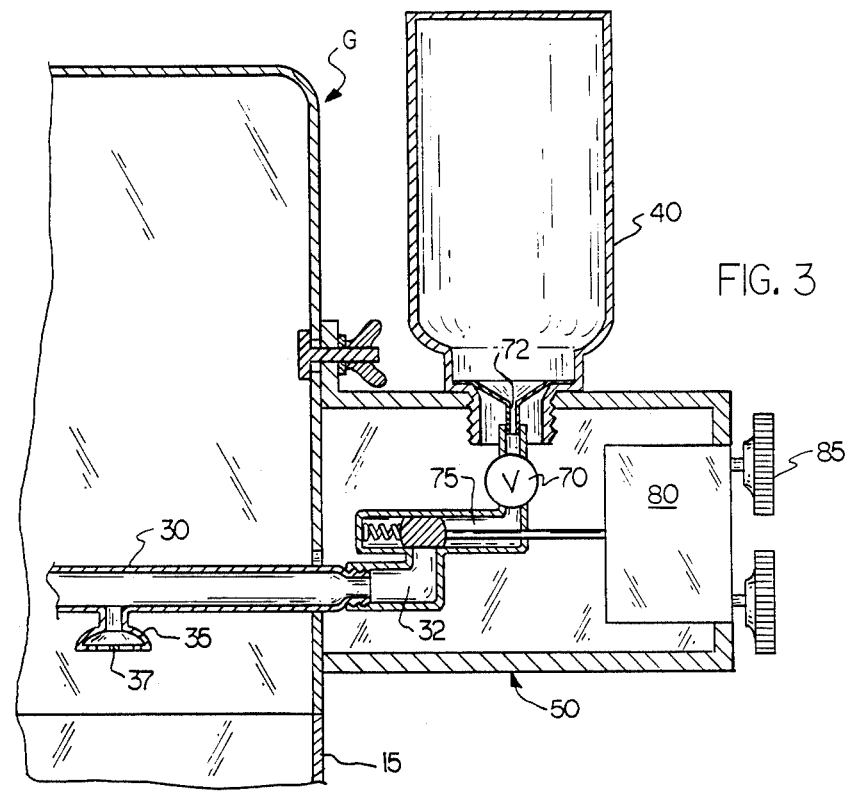
FIG. 3 is a diagrammatic view of the relationship of the sauce supply bottle to the spray distribution heads.

Looking first at FIG. 1, the present invention is shown as it preferably would be mounted in the hood portion 10 of a substantively conventional grill G. The grill G shown in FIGS. 1, 2 and 4 includes: the hood 10 which allows for cooking the food in an opened or closed environment; a lower fuel pan 15; and a food supporting rack or grid member 20, supported above a bed of charcoal briquettes B or other type of solid fuel. Although the grill illustrated and discussed herein is of the charcoal or solid fuel burning type, the present invention is applicable to virtually any type of grill or smoker, including gas and electric. Further, the apparatus as described herein can be modified to fit a residential or commercial closed oven by increasing the dimensions accordingly.

The hood 10 as illustrated is rectangular, mounted on hinges 11, and movable between an open position and a closed position wherein the grill is fully enclosed. However, there are many grills that are of other shapes and have stationary, partial hoods which surround only a portion of the cooking surface. The present invention is fully functional on both types.

In the preferred embodiment, the basting apparatus basically includes: (a) a sauce dispensing means comprised of a sauce delivery tube 30 having a plurality of attached spray heads or nozzles 35; (b) a pressurized sauce bottle 40 which contains a supply of the selected basting sauce; and (c) a control means 50 for controlling the injection of sauce from the bottle 40 into the delivery tube 30.

The basting apparatus is mounted on the grill by means of an elongated slot 60 having a plurality of downwardly slanted notches 62, cut into opposing sidewalls 12 of the hood 10. The slots 60 and notches 62 are approximately midpoint between the hood front wall 14 and rearwall 16, so that the tube 30 and spray heads 35 are suspended in substantially the center of the grill. The ends of delivery tube 30 are positioned in opposing notches 62, the upper notches positioning the tube 30 away from the food rack 20. A wing nut 64 tightens the closed end of the tube in the notch. A second wing nut 65 attaches the housing of the control means 50 to the outside of the hood wall.

Figure 4:
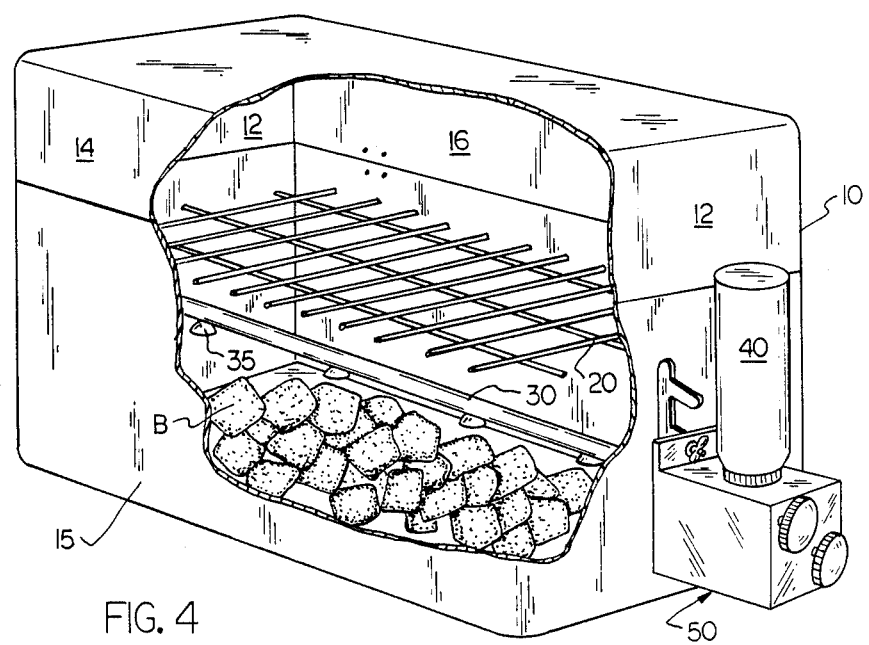
FIG. 4 is a perspective view of the apparatus in an alternate mounting intermediate of the cooking rack and the fuel pan.

An alternate position is shown in FIG. 4 wherein the slots 60 are cut into the opposing sidewalls of the fuel pan 15, allowing the application of a liquid to the charcoal briquettes B in order to increase production of smoke. The approach to mounting the basting apparatus is the same as described above, although a plurality of notches 62 may not be desired in all models, because adjusting the distance between the tube and the coals may be unnecessary. Obviously, grills might be manufactured with slots and notches 60, 62 in both the hood 10 and fuel pan 15. Mounting the basting apparatus in the lower fuel pan portion 15 works best in charcoal or solid fuel grills. Unless modified, adding liquid to the fuel pan could interfere with consistent fuel burning in gas grills because of the spraying of liquid directly on the fuel bed.

Looking next at the individual components of the basting apparatus, the sauce delivery tube 30 and cooperating spray heads 35 are formed from a heat resistant material such as stainless steel or ceramics. The perforated spray heads 35 distribute or spray the sauce over the meat or other foods, as the sauces flow through the delivery tube 30 and down into the spray heads 35.

Sauce is injected into tube 30 from the sauce supply bottle 40 which is preferably a pressurized bottle. Alternatively, a supply of compressed air can be utilized to pull the sauce from the bottle 40 and inject the sauce into tube 30. As preferred and illustrated, however, the bottle 40 is pressurized and is operatively connected to an injection valve 70 which is a component of the sauce application control mechanism 50.

The control mechanism 50 is contained in housing 45 and is the combination of components which cooperate to automatically inject basting sauce from the bottle 50 into delivery tube 30. Control 50 is generally comprised of the aforementioned injection valve 70 and an automatic timing device 80 of a conventional type. The timing device activates the injection valve 70 according to preselected intervals of time to inject basting sauce into the delivery tube. The timing device may be an electronic timer of the type used on numerous types of small appliances, or may be of a mechanical nature. The mechanical type could be a spring-loaded type which winds down over a given time period and upon expiration of the period strikes a plunger or other device to activate valve 70.

The injection valve 70 is of a conventional type mounted between sauce supply bottle 40 and an inlet end 32 of the delivery tube. Upon expiration of the prescribed time period, or by use of a manual override 85, valve 70 is activated to compress a plunger or relief valve 72 in the bottle 40. When 72 is compressed the sauce flows under pressure from the bottle 40 through passageway 75 and into tube inlet 32 and out of spray heads 35. The perforations 37 on the heads 35 break up the flow and expand the spray to substantially cover the entire expanse of rack 20. Because of the pressurization and the intermittant activity of injection valve 70, sauce does not stand in tube 30 and, because of overheating, clog up spray heads 35.

The timing device 80 includes manual overrides in the form of dials 85 which may be rotated to activate valve 70 apart from the preset timer. Therefore, basting sauce may be injected intermediately of prescribed intervals.

Additionally, it may be desirable in some embodiments to provide an insulation means around the pressurized bottle 40 to prevent explosion caused by heat from the grill.

While a preferred embodiment has been described herein, other and further modifications are anticipated and believed to fall within the scope of the claims below.

What is claimed is:

1. A basting apparatus for applying a liquid basting sauce during the cooking of foods on a barbecue grill or smoking device; said basting apparatus comprising:
   (a) a dispensing means having at least one spray head and being mounted in the barbecue grill for delivering the basting sauce to a prescribed area of said barbecue grill;
   (b) a means for adjustably supporting said dispensing means in a prescribed portion of said barbecue grill;
   (c) a an interchangeable liquid supply container for holding a selected basting sauce, operatively connected to said dispensing means;
   (d) a pressurized means for injecting liquid sauce from said supply container into said dispensing means; and
   (e) means for activating said pressurized means to inject liquid sauce at prescribed intervals of time; whereby liquid sauce is injected into said barbecue grill or oven at prescribed times to improve the flavor and quality of foods being cooked.

2. A basting apparatus according to claim 1 wherein said dispensing means includes:
   (a) a delivery tube made from heat resistant material and suspended above a selected area of said barbecue grill;
   (b) a plurality of spray heads operatively connected to and suspended in spaced relationship to each other along the length of said delivery tube;
   (c) one end of said delivery tube being operatively connected to said liquid supply container, and the opposite end being closed.

3. A basting apparatus according to claim 2 and further including:
   (a) said liquid supply container being pressurized;
   (b) a valve means connecting said pressurized supply container to said delivery tube for injection of liquid sauce under pressure to said barbecue grill.

4. A basting apparatus according to claim 1 wherein said pressurized means for injecting liquid sauce from said supply container includes said supply container being in the structure of a pressurized bottle operatively connected to said dispensing means.

5. A basting apparatus according to claim 1 wherein said means for activating said pressurized means includes a timing device operatively connected to said pressurized means; said timing device controlling the injection of liquid sauce at prescribed time intervals.

6. A basting apparatus according to claim 1 wherein said dispensing means is mounted in the barbecue grill in a position above the food product being cooked.

7. A basting apparatus according to claim 1 wherein said dispensing means is mounted in the barbecue grill in a position intermediate of the food being cooked and the firebox.

8. A basting apparatus according to claim 2 wherein said delivery tube is formed of stainless steel.

* * * * *